(12) United States Patent
Naaman

(10) Patent No.: US 9,501,134 B2
(45) Date of Patent: *Nov. 22, 2016

(54) REMOTELY CONTROLLABLE ELECTRICAL SOCKETS WITH PLUGGED APPLIANCE DETECTION AND IDENTIFICATION

(71) Applicant: Laith A Naaman, Cupertino, CA (US)

(72) Inventor: Laith A Naaman, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,246

(22) Filed: Mar. 23, 2016

(65) Prior Publication Data

US 2016/0224101 A1 Aug. 4, 2016

Related U.S. Application Data

(63) Continuation of application No. 13/644,346, filed on Oct. 4, 2012, now Pat. No. 9,304,947.

(51) Int. Cl.
G06F 13/00 (2006.01)
G06F 1/32 (2006.01)
G06F 1/26 (2006.01)

(52) U.S. Cl.
CPC ............. G06F 1/3287 (2013.01); G06F 1/266 (2013.01); G06F 1/3296 (2013.01)

(58) Field of Classification Search
CPC .................................. G06F 13/10; H02J 3/14
See application file for complete search history.

(56) References Cited

U.S. PATENT DOCUMENTS

| | | | | |
|---|---|---|---|---|
| 5,544,036 A * | 8/1996 | Brown, Jr. | ......... | G05D 23/1905 340/12.52 |
| 5,650,771 A * | 7/1997 | Lee | ......................... | G01R 15/12 340/538.17 |
| 5,793,125 A * | 8/1998 | Tarng | .................... | G05B 19/042 307/117 |
| 7,527,519 B2 * | 5/2009 | Van Dyne | ............... | H01R 13/70 439/441 |
| 8,000,074 B2 * | 8/2011 | Jones | ............... | G06K 19/07758 361/93.1 |
| 8,374,729 B2 * | 2/2013 | Chapel | ................ | H02J 13/0082 307/29 |
| 8,461,725 B1 * | 6/2013 | Stubbs | ...................... | H01H 9/54 307/140 |
| 8,471,415 B1 * | 6/2013 | Heninwolf | ......... | H01R 13/6683 307/125 |
| 8,604,914 B2 * | 12/2013 | Clarke | ...................... | H02J 3/14 200/51.02 |
| 8,604,915 B2 * | 12/2013 | Clarke | ...................... | H02J 3/14 200/51.02 |
| 8,818,532 B1 * | 8/2014 | Vasquez | ................ | H02J 13/002 700/17 |
| 9,304,947 B2 * | 4/2016 | Naaman | ................... | G06F 13/10 |
| 2007/0047573 A1 * | 3/2007 | Logvinov | .............. | H01R 31/06 370/463 |
| 2010/0138363 A1 * | 6/2010 | Batterberry | ............ | G06Q 10/04 705/412 |
| 2011/0087904 A1 * | 4/2011 | Lee | .......................... | G06F 1/26 713/320 |
| 2011/0097926 A1 * | 4/2011 | Bowen | .................... | H01H 43/28 439/488 |
| 2012/0031963 A1 * | 2/2012 | Adipietro | ............ | H01M 10/465 235/375 |
| 2012/0089263 A1 * | 4/2012 | Park | ....................... | H02J 13/001 700/291 |
| 2012/0119577 A1 * | 5/2012 | Clarke | ....................... | H02J 3/14 307/40 |
| 2012/0223840 A1 * | 9/2012 | Guymon | .................. | H04B 3/54 340/870.02 |

* cited by examiner

Primary Examiner — Tammara Peyton
(74) Attorney, Agent, or Firm — Polsinelli LLP

(57) ABSTRACT

Embodiments of the present invention provide for a remotely controllable electrical socket. Such sockets may include an electrical conductor for receiving a plug of an electrical device. The plug may be associated with a tag for receiving identifying information that corresponds to the electrical device. Exemplary sockets may further include a tag reader for obtaining identifying information from the tag, a sensor for detecting if the plug is inserted in the outlet, and a communications interface for wirelessly sending information to a computing device regarding the identifying information and whether the plug is inserted in the outlet. The communications interface may also receive operational instructions from the computing device (e.g., to turn the power to the plug/electrical device ON or OFF).

10 Claims, 3 Drawing Sheets

REMOTELY CONTROLLABLE ELECTRICAL SOCKETS WITH PLUGGED APPLIANCE DETECTION AND IDENTIFICATION

CROSS-REFERENCE TO RELATED APPLICATIONS

This application is a continuation and claims the priority benefit of U.S. patent application Ser. No. 13/644,346 filed Oct. 4, 2012, now U.S. Pat. No. 9,304,947, the disclosure of which is incorporated herein by reference.

BACKGROUND

1. Field of the Invention

The present technology relates generally to remotely controllable electrical sockets, and more specifically, but not by way of limitation, to remotely controllable electrical sockets that may identify plugged appliances being coupled therewith.

2. Description of Related Art

Detection and recordation of the location of electrical devices, such as sockets, outlets, and or other electrical interfaces within a structure, is a common practice. For example, a structure may include many 110 and 220 volt outlets (as well as outlets having other voltages) disposed in various locations within the structure. These outlets may be electrically coupled with a main power source through a breaker panel via (e.g., switch) one or more breakers (e.g., switches). Moreover, each breaker (or pair of breakers) may be assigned to, and electrically coupled with a socket located within the structure. Depending on the amount of voltage required to operate a particular device, devices may be selectively coupled with a socket. It is noteworthy to mention that some devices (for example, an air conditioning unit) may be hard wired into the panel without use of a socket).

The location of each socket within the structure is commonly labeled within the breaker panel. For example, a group of sockets within a bedroom may be labeled as "Master Bedroom." Therefore, the location of an electrical device within a structure may be determined by determining the socket with which the device is electrically coupled.

While this type of location determination of devices is reliable for devices that arepermanently located (such as with an electric stove or an air conditioning unit), such information is less valuable for portable electrical devices, such as irons, space heaters, and other small electronic devices that may be selectively coupled with outlets throughout the structure. For example, an iron may be relocated from room to room within the structure.

Additionally, these portable devices may be more frequently left in the "on" position. Unfortunately, some of these portable devices may pose fire hazards if left unattended, in the "on" position. For example, an individual may forget to turn an iron to the off position before leaving for the day. An unattended iron poses a significant fire hazard to the structure.

Remotely controlled electrical sockets use a mechanism (electromechanical or semiconductor) to connect or separate the outlet metal contacts from electrical power. To maintain the connection of the said metal contacts of the outlet to electric power, a certain amount of electrical energy is consumed regardless of the electrical load connected to the said outlet, any appliance is plugged in or not. This happens when a user simply pulls the plug out of the outlet without manually turning the said outlet OFF. This results in a waste of electrical energy in maintaining the connection between the metal contacts of the outlet and electrical power.

A sensor that detects the presence or lack of a plug inserted in a socket outlet signals to the control unit of the said socket to connect or disconnect electrical power to the metal contacts of the outlet. This will reduce the electrical energy consumed by the socket when it is not in use. An audible and or a visual signal will indicate to the user that the plug has been detected when it is inserted in the socket.

Optionally, the said socket may include a USB charger for cell phones or other chargeable devices. The said charger will have a mechanism to detect the rate of flow of electrical energy, current, to the USB connector and convey this information to the control unit. Based on that information, the micro controller may decide to disconnect the socket from the AC mains.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
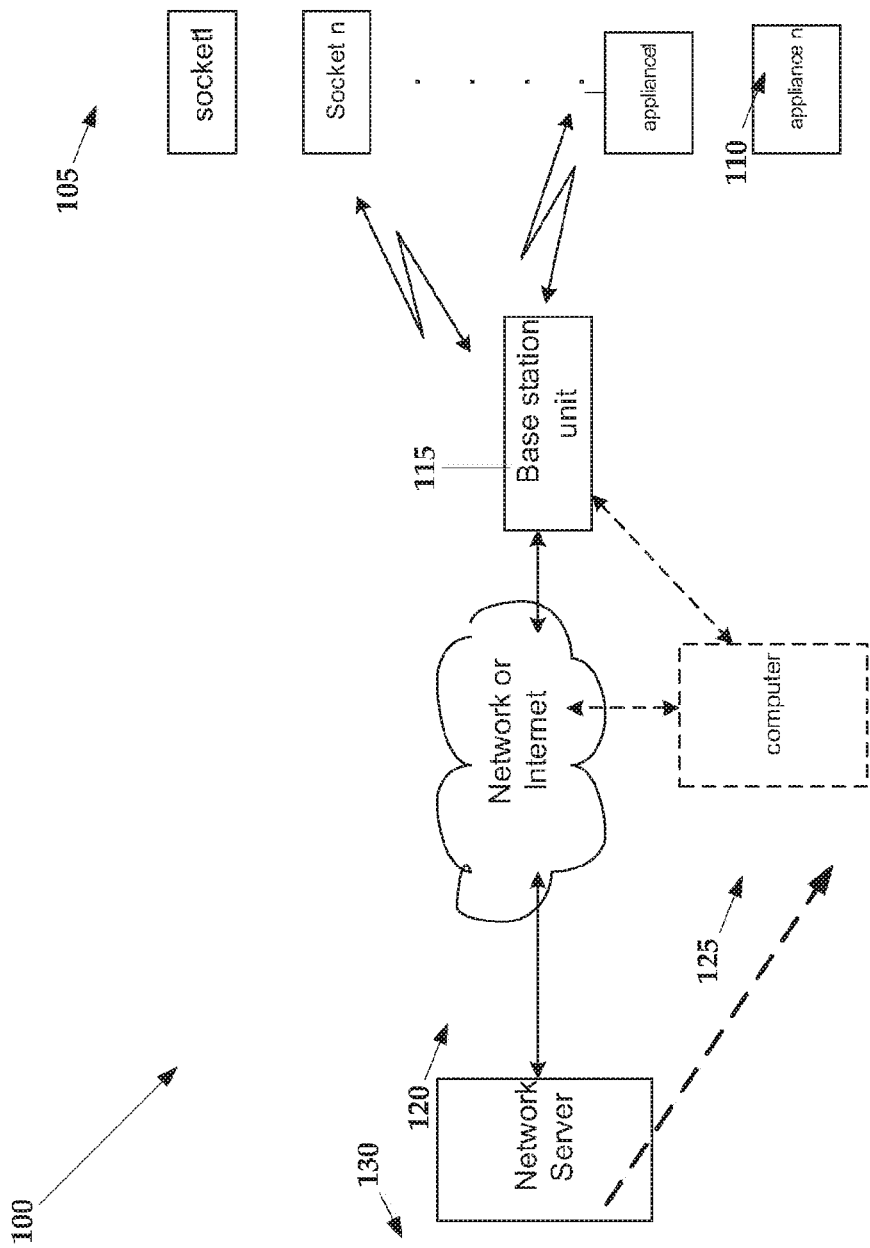
FIG. 1 is a block diagram of an exemplary architecture of a system for practicing embodiments of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

As background, electrical sockets that can be turned ON or OFF remotely are fairly common, with control being either wired (through building electrical wiring system itself) or wireless such as using radio frequency, ultrasonic waves or simply clapping.

Additionally, there has been increasing awareness and interest in conserving electrical energy consumed by appliances when they are not used, i.e., in what is called standby mode.

The present technology described herein enables the user to identify the appliance that is being plugged in a particular socket and decide to turn it ON or OFF. The identification can be either the type of the appliance (e.g., an iron or a heater) or by the electrical energy it consumes (e.g., high power, medium power or low power). This is important especially in the case of portable appliances, such as but not limited to electric space heaters, irons, curling irons and hair dryers, because a user can find out if he/she forgot to turn OFF such an appliance. The control is achieved manually or remotely via a network such as, but not limited to, the Internet.

The present technology may include, but is not limited to:

One or more electrical sockets, each with one or more outlets, such socket may be pluggable into an existing socket, be the wall socket itself, or have an extension wire that plugs into an electric socket.

An identification tag with a label attached to the plug of the appliance contains the identification of the appliance. The identity of the appliance can stored in but not limited to electrical, magnetic, capacitive or optical form. The tag can be programmable/reprogrammable or pre programmed with a label.

A tag reader in the said sockets that extracts the identity of the plugged appliance, the communication of the appliance identity from the said tag to the said tag reader can be provided by but not limited to radio frequency, optical, magnetic or by direct electrical contact.

Optionally a current sensing device is used to determine or estimate the amount of current a plugged appliance is consuming.

Optionally USB interface with a charging circuit is used to charge portable rechargeable devices such as but not limited to cell phones and tablet computers. The flow of charging current can be initiated by pressing a switch.

The said sockets may contain communications interface (wired or wireless) and a microprocessor to control the operation of the sockets.

A base station unit that communicates with said sockets via the communication interface and connects to a computer, e.g., via USB or other interfaces, or to a network such as, but not limited to, the internet.

The said sockets may contain DC power supply with back-up battery, optional protection devices power switching devices such as but not limited to relays or Silicon Controlled Rectifiers (SCR) to connect and disconnect electric power to an outlet as commanded by the said microprocessor.

The said sockets may contain indicators such as Light Emitting Diodes (LED) and manual switches to enable the user to manually control the status of the said sockets and indicators to signal that a plug has be properly inserted.

The said socket may contain a sensor that detects a plug being inserted in the socket outlet. The said sensor can be, but not limited to, optical, acoustic, magnetic, capacitive or tactile.

The said base station unit can receive commands either from the internet or from a computer if it is connected to one and report back the status of the sockets or other appliances it may be controlling. The said base station unit uses these commands to control the operation of the said sockets or any other appliances it may be controlling.

A network server that connects to a number of such base stations and communicates with them; send commands and receive status reports.

Referring now to the collective drawings (FIGS. 1-3), an exemplary system 100 for practicing aspects of the present technology is shown in FIG. 1. The system 100 is shown as including a plurality of sockets 105 (shown as sockets 1-n), each of the plurality of sockets 105 being electrically coupled with one or more appliances 110 (shown as appliance 1-n). Typically, an appliance 110 is electrically coupled with a socket 105 via a plug.

Each of the sockets 105 may be electrically coupled with a base station 115 that monitors the operations of each socket 105. The base station 115 (base station unit) may in turn be communicatively coupled with a computing device 125 (computer) directly (such as with a local computer) or indirectly via communications network 120 and/or a network server 130 (such as with a remote computing system). The communications network 120 may include any one of a number of private and/or public communications network such as the Internet.

Generally speaking, the computing device 125 may be described in greater detail with reference to the computing system 300 of FIG. 3, although the computing device 125 may include a particular purpose computing system that include instructions that are executable by a processor to remotely control the sockets 105.

Figure 2A:
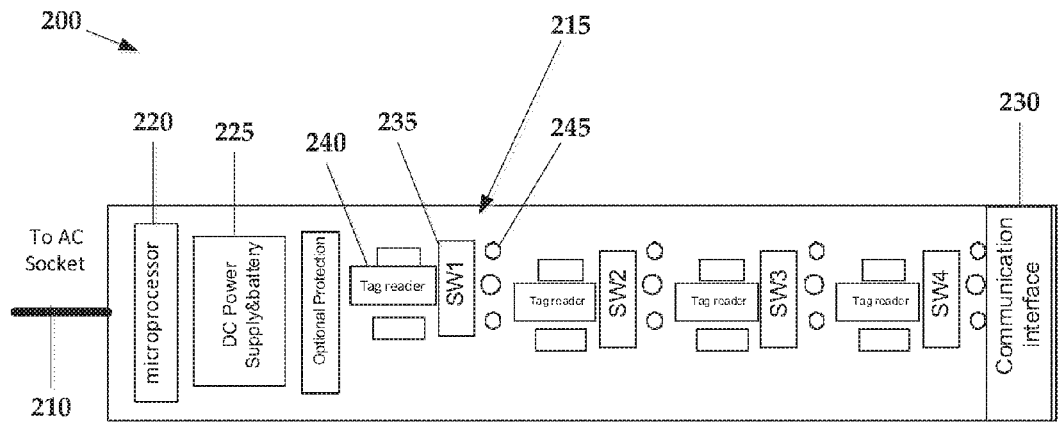
FIG. 2A is a block diagram of an exemplary socket device.
Figure 2B:
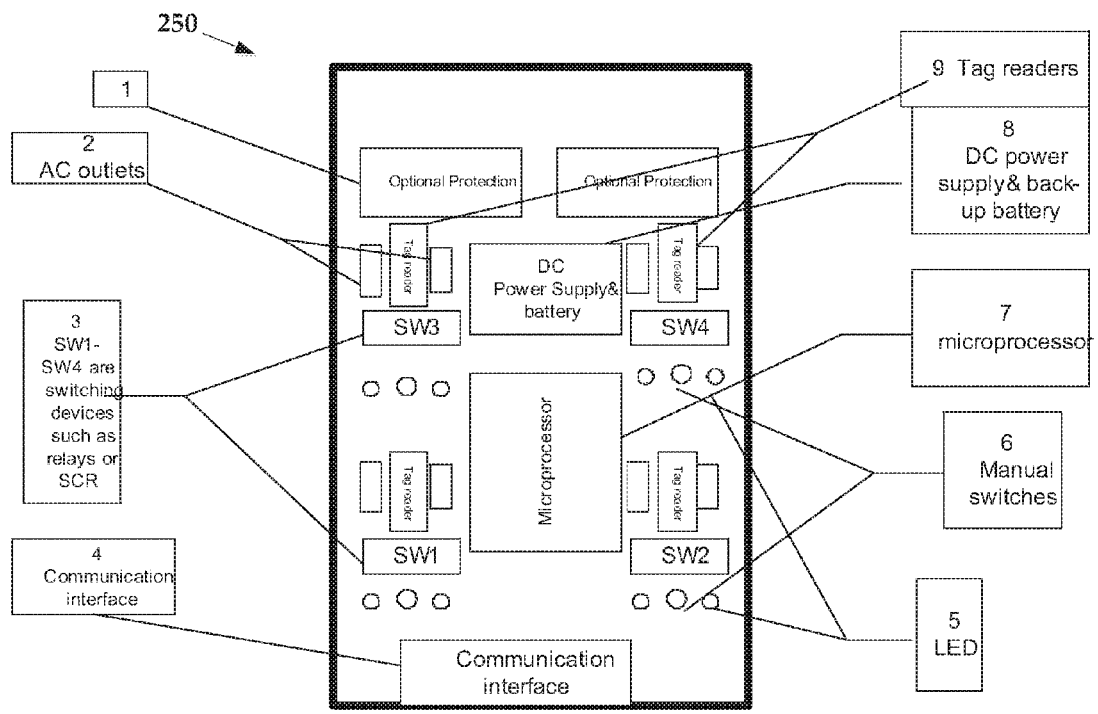
FIG. 2B is a block diagram of an alternative embodiment of an exemplary socket device.

The socket device may be embodied as a typical power strip that electrically couples with a standard electrical wall outlet (not shown) via an electrical cord, or as an adapter that plugs into a socket. FIG. 2 illustrates an exemplary socket device, constructed in accordance with the present disclosure. The adapter 200 may include a plurality of individual sockets (only socket 215 has been labeled for clarity) that are arranged in linear or other orientations. The adapter 200 may include a microprocessor 207 that controls the operation of the components of the adapter 200. The adapter 200 may also include a DC power supply 208 that provides electrical energy to the components of the adapter 200 with an optional backup battery, although in some embodiments, the components of the adapter may receive electrical energy via the cord.

The adapter 200 may also include a communications interface 204 that communicatively couples the strip 200 with the base station 115. It will be understood that the communications interface 204 may include a radio frequency identification device "RFID" (either passive or active), a wireless device such as Bluetooth, and cellular, and/or wired connection such as Ethernet. One of ordinary skill in the art will appreciate that many types of communications interfaces that can facilitate the communication of data between the base station 115 and the sockets 215 of the adapter 200 may also likewise be utilized in accordance with the present technology.

Each socket 215 may include female electrical conductors for receiving the male electrical conductors of a plug of a device (not shown). The socket 215 may also include a switch 203 that is communicatively coupled with the microprocessor 207. As such, the microprocessor 220 may establish or sever the delivery of electrical energy through the socket 215, based upon signals remotely received from the base station 115.

Each socket 215 further includes a tag reader 208 that reads tag data from a plug that is electrically coupled with the socket 215 and a plug sensor 212. For example, when a plug (again, not shown) is inserted into the socket 215, the tag reader 209 may obtain tag data from the plug that identifies the particular electrical device associated with the plug. If the plug does not have a tag the sensor 212 will sense its presence and allows that outlet to be turned ON, even though the socket would not be able to identify the plugged appliance.

Although not shown, the socket adapter 200 may include indicators; visual, audible or otherwise, to indicate to the user that a plug was sensed and if it had a tag, identified The socket 215 may also include one or more LED lights 205 that indicate the status of the switch 203 (e.g., whether the switch is ON or OFF).

Although not shown, the present technology may include any one of a number of wall outlets that are installed into the wall of a structure, rather than socket devices that interface with a wall outlet.

In operation, a programmable or pre programmed tag is attached, optionally glued, to the plug of an appliance and the label on the tag is noted and the appliance description is entered in the appliance table in the software application residing in the user's computer, such as computing device 125. An exemplary appliance table is shown in Table 1.

TABLE 1

| Label | Appliance |
|-------|-----------|
| 1 | Iron |
| 2 | Curling Iron |
| 3 | Space heater 1 |
| ... | ... |

When an appliance with a tag is plugged in a said controlled socket, the tag reader will determine the identity of the plugged appliance. Alternatively, the exact identification of the appliance (what it is) may not be necessary, only how much electrical power it consumes. A color code system or another scale may be used to identify appliances, such as red, yellow and green for high, medium and low power appliances, respectively. The appliance can then be turned ON or OFF from the manual switch or remotely from the base station and the LED indicators will show the status. The status of all appliances plugged in the said controlled socket will be relayed via the communications interface to the base station which relays it to network server over the network or the Internet. This allows the user to check the status of whatever appliance is plugged in the controlled sockets using a computer or any other portable communication device such as a smart phone and alter the status of any appliance. If the user so chooses, an alarm can be generated periodically if a certain appliance is left ON longer than a certain duration set by the user, or set a turn ON and turn OFF times for the appliance.

The Socket's electronic circuit knows the socket is not being used by sensing that no plug is inserted in its AC outlets and no DC current is flowing from the optional charging circuit to the optional USB connector. When that happens, the micro-controller will de-energize the switch that connects the power supply circuit to the AC mains, and put the electronic control circuit of the socket in deep sleep mode drawing its sleep electrical current from the back up battery.

The micro-controller while in deep sleep can be awakened (interrupted) by either sensing a plug (with or without a tag) has been inserted or the Charge button has been pressed. The said microcontroller will re-energize the switch connecting the power supply circuit to the AC mains drawing the necessary electric current from the back up battery. When the power supply circuit reaches its steady state and generates its rated voltage, it takes over powering the electronic circuit of the socket to preserve battery energy.

After sensing a plug has been inserted, the micro-controller waits a pre set duration for the corresponding ON/OFF switch to be pressed or a command from the base unit via the communications interface to turn that outlet ON. If the said wait duration lapses and no other plug is inserted nor the optional charging circuit is supplying current, the microcontroller will notify the base station of its status and go in deep sleep again, waking periodically for a short period of time to check if the base unit is sending it commands. The said period will longer than the time needed to receive a wireless package to account for timing offsets between the socket and the base unit. The communications between the socket and the base unit may synchronous or asynchronous; in the former the base unit sends a time stamp to the socket microcontroller every time it is awakened to listen to the said base unit. This would enable the base unit to accurately predict when the asleep socket board is awakened and establish communication.

When the said socket is being used, i.e., the DC power supply circuit is connected to the AC mains, the micro controller can decide when to start recharging the rechargeable back up battery so as to maximize its life.

Figure 3:
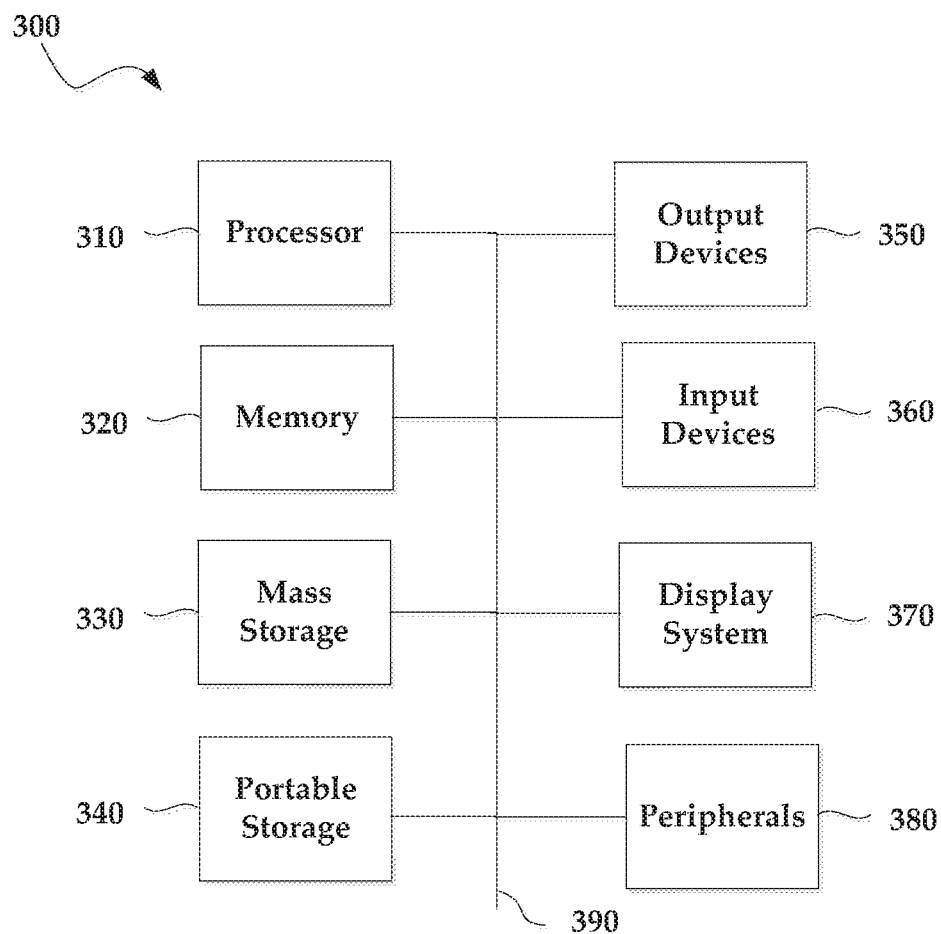
FIG. 3 is a block diagram of an exemplary computing system for implementing embodiments of the present technology.

FIG. 3 illustrates an exemplary computing system 300 that may be used to implement an embodiment of the present technology. The system 300 of FIG. 3 may be implemented in the contexts of the likes of computing systems, networks, servers, or combinations thereof disclosed herein. The computing system 300 of FIG. 3 includes one or more processors 310 and main memory 320. Main memory 320 stores, in part, instructions and data for execution by processor 310. Main memory 320 may store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. The components may be connected through one or more data transport means. Processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 may store the system software for implementing embodiments of the present technology for purposes of loading that software into main memory 320.

Portable storage device 340 operates in conjunction with a portable non-volatile storage medium, such as a floppy disk, compact disk, digital video disc, or USB storage device, to input and output data and code to and from the computer system 300 of FIG. 3. The system software for implementing embodiments of the present technology may be stored on such a portable medium and input to the computer system 300 via the portable storage device 340.

Input devices 360 provide a portion of a user interface. Input devices 360 may include an alphanumeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. Peripheral device(s) 380 may include a modem or a router.

The components provided in the computer system 300 of FIG. 3 are those typically found in computer systems that may be suitable for use with embodiments of the present technology and are intended to represent a broad category of such computer components that are well known in the art. Thus, the computer system 300 of FIG. 3 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A remotely controllable electrical socket, comprising:
    an electrical conductor that receives a plug of an electrical device and that provides power to the electrical device, the plug associated with a tag that provides identifying information that corresponds to the electrical device, wherein the identifying information includes a type of appliance associated with the electrical device;
    a tag reader:
    that obtains the identifying information from the tag associated with the plug of the electrical device, the tag reader including one or more electrical contacts that electrically connect the tag to the tag reader when the electrical conductor receives the plug of the electrical device, and
    that detects that the plug is inserted in the socket via a sensor, wherein the sensor further identifies a power state of the electrical device when the sensor detects that the plug of the electrical device is inserted in the socket, the power state identifying whether the electrical device is currently in a powered ON state or is currently in a powered OFF state; and
    a switch coupling the electrical conductor to a power supply, the switch being selectively controllable from the computing device based on the information received at the computing device, wherein the computing device generates a periodic alarm based on the information received from the communications interface and user preferences, the user preferences indicating a maximum time duration that the electrical device is specified to remain in the powered ON state, wherein the periodic alarm begins to be generated when the electrical device is identified to have been in the powered ON state past the maximum time duration specified by the user preferences.

2. The remotely controllable electrical socket further comprising:
    a memory; and
    a microprocessor that executes instructions out of the memory.

3. The remotely controllable electrical socket of claim 1, further comprising one or more electrical power protection devices.

4. The remotely controllable electrical socket of claim 1, wherein a location of the electrical device is identified by identifying that the socket is located at a permanent structural location that corresponds to the identified location.

5. The remotely controllable electrical socket of claim 1, wherein the remotely controllable electrical socket is electrically coupled to a base station that is communicatively coupled to a computer.

6. The remotely controllable electrical socket of claim 5, wherein the computer communicates with the base station over a computer network and controls the power state of the electrical device.

7. The remotely controllable electrical socket of claim 5, wherein the computer communicates with the base station over the internet.

8. The remotely controllable electrical socket of claim 5, wherein the base station controls the power state of the electrical device.

9. The remotely controllable electrical socket of claim 5, wherein a user accessing the computer views the power state of the electrical device on a display associated with the computer.

10. The remotely controllable electrical socket of claim 9, wherein the user sets a turn on time over a user interface associated with the computer.

* * * * *